United States Patent Office 3,019,221
Patented Jan. 30, 1962

3,019,221
STYRYL-BISBENZIMIDAZOLE BRIGHTENERS
Geza E. Schoen, Jr., Middlesex, and Julian J. Leavitt, Plainfield, N.J., assignors to American Cyanamid Company, New York, N.Y., a corporation of Maine
No Drawing. Filed June 15, 1959, Ser. No. 820,103
7 Claims. (Cl. 260—240)

This invention relates to new benzimidazole brighteners. More specifically, this invention relates to new compounds of the formula

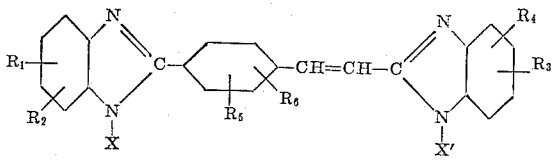

in which $R_1$, $R_2$, $R_3$, $R_4$, $R_5$ and $R_6$ may each be hydrogen, lower alkyl, lower alkoxy, chlorine or bromine and X and X' may each be hydrogen, alkyl, aralkyl or alkenyl.

Optical bleaching agents have been developed for a wide variety of fibers. A large number of different classes of compounds have been and are being produced for this purpose. With the introduction of each new synthetic fiber, new problems of application for obtaining satisfactory brightening have been encountered and new brightening agents have had to be developed.

A further complication to the problem of brightening textile fibers has been the increased prevalence of various resin treatments for the textile fibers especially cellulose fibers. Resins are applied to cellulosic fabrics to increase wrinkle resistance and crease resistance and to achieve many other improved properties. While these resins give the consumer greatly improved textiles, they present great problems in the optical bleaching field. The brighteners in present use do not effectively brighten resin-treated cotton. It would be expected from these prior compounds that the brighteners of our invention would be intermediate in properties between these two processes, and it is very surprising to discover that the optical bleaching agents of our invention are outstandingly superior to either of these types especially when applied to resin-treated fabrics. This is shown by their outstanding fluorescent intensity and whitening efficiency on many of the most important fabrics. They may be applied with beneficial results to cellulose fibers such as cotton, regenerated cellulose and the like, synthetic fibers such as nylon, acetate and the like. Especially, they may be applied to resin-treated cellulose fabrics to give brightening effects which are not obtainable by the use of other types of brighteners.

The brighteners of our invention are conveniently prepared by the reaction of a p-carboxycinnamic acid with an o-phenylenediamine followed by ring closure to the bis-imidazole. P-carboxycinnamic acids can be prepared by various methods. The simple, unsubstituted p-carboxycinnamic acid, which is our preferred starting material, is especially attainable by a number of alternative routes. For example, terephthalaldehydric ester may be converted to p-carboxycinnamic acid by means of reaction with acetic anhydride in the presence of sodium acetate. It may also be prepared from terephthalaldehydic ester with malonic acid followed by decarboxylation to the p-carboxycinnamic acid. A further preparation is a Meerwein type of condensation reaction in which a diazotized p-aminobenzoic acid is condensed with maleic anhydride; decarboxylation occurs spontaneously to give the desired p-carboxycinnamic acid. This latter synthesis especially is adaptable for the preparation of various substituted p-carboxycinnamic acids for use in preparing the optical bleaching agents of our invention. The p-carboxycinnamic acids which may be used as starting materials include the following:

2-methyl-4-carboxycinnamic acid
2-ethyl-4-carboxycinnamic acid
2-propyl-4-carboxycinnamic acid
2-chloro-4-carboxycinnamic acid
2-bromo-4-carboxycinnamic acid
3-methyl-4-carboxycinnamic acid
3-chloro-4-carboxycinnamic acid
3-bromo-4-carboxycinnamic acid
2,5-dimethyl-4-carboxycinnamic acid
2,5-dichloro-4-carboxycinnamic acid
2-chloro-5-methyl-4-carboxycinnamic acid
3-methoxy-4-carboxycinnamic acid
2-methoxy-4-carboxycinnamic acid The above compounds can be most conveniently prepared as mentioned above from the correspondingly substituted p-aminobenzoic acids. The most commonly used ones, such as those derived from stilbene disulfonic acid, which have excellent affinity for untreated cotton, have much impaired affinity for resin-treated cotton, as shown by poor exhaustion and poor fastness to rinsing. In addition, many deleterious side effects are noticed for many brighteners on current use such as yellowing on build-up, chlorine and pH instability and the like.

We have found a class of bis-imidazole brighteners heretofore unknown which possesses surprising advantages in the optical bleaching of resin-treated fibers as well as being usable advantageously on such diverse fabrics as nylon, wool and untreated cotton. These benzimidazole brighteners have the generic formula

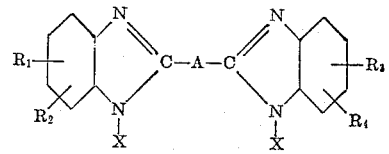

in which A has, as indicated above, the definition

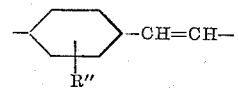

and in which the R's and X's have the meanings given above. Benzimidazole brighteners have been reported in the past having as A either the group

—CH=CH— or the group

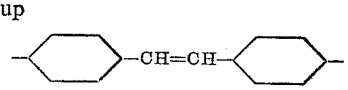

The o-phenylenediamines with which the p-carboxycinnamic acids are condensed to form the compounds of my invention include the following 4-methyl-1,2-phenylenediamine
3-methyl-1,2-phenylenediamine
4-ethyl-1,2-phenylenediamine
4-propyl-1,2-phenylenediamine
3,4-dimethyl-1,2-phenylenediamine
4,5-dimethyl-1,2-phenylenediamine
3,5-dimethyl-1,2-phenylenediamine
3,6-dimethyl-1,2-phenylenediamine
3,6-diethyl-1,2-phenylenediamine
3-methyl-6-ethyl-1,2-phenylenediamine
3-chloro-1,2-phenylenediamine
4-chloro-1,2-phenylenediamine
4-bromo-1,2-phenylenediamine
4,5-dichloro-1,2-phenylenediamine
3,6-dichloro-1,2-phenylenediamine 3-chloro-6-methyl-1,2-phenylenediamine
4-chloro-5-methyl-1,2-phenylenediamine
4-chloro-5-ethyl-1,2-phenylenediamine
4-methoxy-1,2-phenylenediamine
N-methyl-1,2-phenylenediamine
N-allyl-1,2-phenylenediamine
N-(2-hydroxyethyl)-1,2-phenylenediamine
N-benzyl-1,2-phenylenediamine
N-(2,3-dihydroxypropyl)-1,2-phenylenediamine When a substituent other than hydrogen is desired on the imidazole nitrogens, various methods of synthesis are also possible. One method is to start with one of the N-alkylated monosubstituted o-phenylenediamines described above. Alternatively, the N-substituted product may be prepared by alkylating the synthesized bis-benzimidazole. Such a reaction may be an alkylation with dialkylsulfates, as, for example, dimethyl sulfate, diethyl sulfate and the like, or with an alkyl bromide such as ethyl bromide, ethylenechlorhydrin, epichlorhydrin (following by hydrolysis to give a dihydroxypropyl radical) 2,3-dihydroxypropyl chloride and the like, or by reaction by other substituted radicals such as benzyl chloride and substituted benzyl chlorides, allyl chloride, butyl chloride, methallyl chloride and the like. Direct alkylation generally gives the monoalkylated brightener or mixtures of the mono and bis alkylated brighteners.

Mixtures in which the substituents on the two benzimidazole radicals are different can be obtained by starting with a mixture of different o-phenylenediamines. The product obtained will be a mixture of the two symmetrical benzimidazoles with the unsymmetrical bis-benzimidazole. An alternative route is the alkylation of the product obtained from p-carboxycinnamic acid with one mole of an o-phenylenediamine followed by reaction with a second mole of an o-phenylene diamine. By using this route X and X' can be different if the o-phenylene diamines are differently N-substituted and R and R' are different if the nuclear substituents are different.

The brighteners of our invention may be applied by the usual methods for applying non-ionic brighteners. A useful method is dissolution of the brightener in a solvent, such as dimethylformamide, and the addition of the solvent solution to water or to water containing a surface-active agent to form a dispersion. This dispersion is then used as a dyebath from which the brightener can be applied to the fabric.

The products of our invention are especially useful for application to resin-treated cellulosic fabrics, especially cotton fabrics. Cotton fabrics of this type are often treated with such resins as polymethylolated melamine, dimethylolurea, substituted alkalene ureas, triazones such as dimethyloltetrahydro-5-ethyl-2(1)-triazone, diglycidyl ethers, and alkylated derivatives of these materials. One or more of these represent standard textile resin treatment of cellulose.

Our invention can be illustrated by the following examples in which parts are by weight unless otherwise specified.

*Example 1*

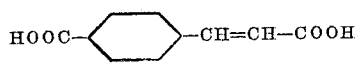

A mixture of 5.66 parts of the ethyl ester of terepthalaldehydic acid and 3.64 parts of malonic acid in 9 parts of 95% ethanol containing 1 part of pyridine is heated at the reflux temperature until reaction is substantially complete. The solvent is then removed from the mixture by evaporation. To the residue is added 9 parts 95% ethanol and 5 parts of 5 N sodium hydroxide solution. The resulting slurry is heated a short time at steam bath temperature (to hydrolyze the ester group) and the mixture is then diluted to about 200 parts total with water. After clarification and acidification with concentrated hydrochloric acid the solid product is removed by filtration, washed with hot water and dried.

*Example 2* p-Aminobenzoic acid is diazotized by dissolving 137 g. in a mixture of 680 ml. of water and 83 ml. of conc. HCl, and adding a solution of 69 g. of sodium nitrite in 180 ml. water at 0° C. Sulfamic acid is added to destroy excess nitrous acid, followed by 330 g. of sodium acetate trihydrate to lower the acidity. This diazo solution, at room temperature, is now added to a solution of 108 g. of maleic anhydride in 2500 ml. of acetone followed by a solution of 42 g. of cupric chloride in 200 ml. of water. The reaction is exothermic, and the temperature rises to 35–40° C. It is allowed to proceed to completion without temperature control, and when the evolution of nitrogen has ceased and there is no further evidence of diazo present, the mixture is heated briefly at 50° C. and strongly acidified. After removal of the acetone, the precipitate is filtered off and washed. This gives crude trans-p-carboxycinnamic acid. Chilling of the mother liquor gives additional yield of crude p-carboxycinnamic acid, this being the cis isomer. Either the cis or trans isomer or a mixture of the two can be used without purification in the next step for preparing bis-benzimidazole brighteners, the same product being obtained in any case.

*Example 3*

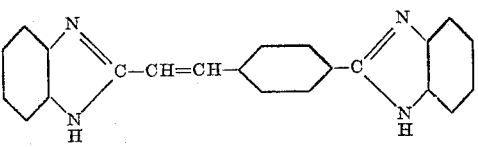

A mixture of 1.92 parts of p-carboxycinnamic acid, from Example 1, 12 parts of o-phenylenediamine and 0.1 part of boric acid is heated with stirring at 200–205° C. for a short time and then at 240° C. until reaction is substantially complete. After cooling, 45 parts of 95% ethanol is added. After agitation, the solid product is removed by filtration. The solid is ground and extracted with 95% ethanol. After extraction, the residue is dissolved in 270 parts 95% ethanol and 20 parts 5 N sodium hydroxide at the boiling point. After clarification with activated charcoal, the solution is diluted with 600 parts water and acidified with concentrated hydrochloric acid. The solid product which precipitates is removed by filtration and dried giving 2.18 parts of the desired brightener compound. This may be purified by further reprecipitation from alkaline solution by acidification.

*Example 4*

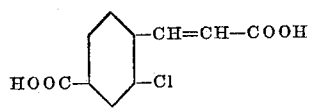

3-chloro-4-aminobenzoic acid, 171.5 g., is diazotized, and the diazo treated with maleic anhydride according to the procedure of Example 2. A mixture of the cis and trans isomers of 2-chloro-4-carboxycinnamic acid is obtained which can be separated by fractional crystallization.

In place of the 3-chloro-4-aminobenzoic acid one may also use the equimolar amount of 3-bromo-4-aminobenzoic acid, 3-methyl-4-aminobenzoic acid or 4-amino-5-chloro-2-toluic acid, to obtain the corresponding substituted p-carboxycinnamic acid.

*Example 5*

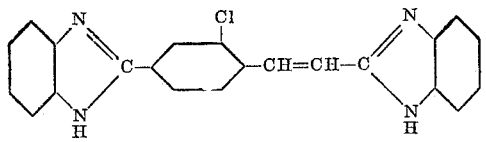

2-chloro-4-carboxycinnamic acid, 2.27 g., is reacted with 12 g. of o-phenylenediamine according to the procedure of Example 3, to give the corresponding substituted bis-benzimidazole. Still other substituted bis-benzimidazoles are obtained by starting with equimolar amounts of 2-bromo-4-carboxycinnamic acid, 2-methyl-4-carboxycinnamic acid and 2-chloro-5-methyl-4-carboxycinnamic acid, respectively.

*Example 6*

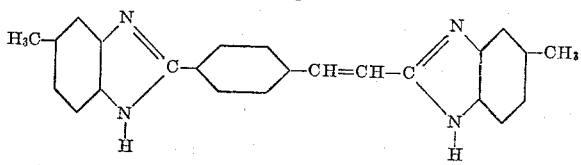

A mixture of 1.92 parts of p-carboxycinnamic acid and 12 parts of 4-methyl-1,2-phenylenediamine is reacted according to the procedure of Example 3, giving the corresponding nuclear-substituted bis-benzimidazole. Instead of 4-methyl-1,2-phenylenediamine one may use equimolar amounts of 4,5-dimethyl-1,2-phenylenediamine, 4-chloro-1,2-phenylenediamine, 4-bromo-1,2-phenylenediamine, 3,6-dimethyl-1,2-phenylenediamine, 4-methoxy-1,2-phenylenediamine, 4-chloro-5-methyl-1,2-phenylenediamine, to obtain still another substituted bis-benzimidazole.

*Example 7*

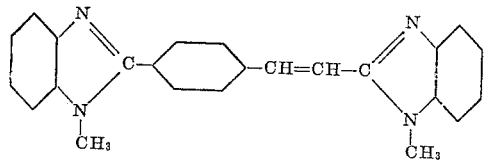

The procedure of Example 3 is followed using an equivalent amount of N-methyl-o-phenylene diamine in place of the o-phenylene diamine. The product is the compound of the above structure. Similarly, when N-allyl-o-phenylenediamine, N-benzyl-o-phenylenediamine, N-2-hydroxyethyl-o-phenylenediamine or N-2,3-dihydroxypropyl-o-phenylenediamine is used in the procedure of Example 3, the correspondingly substituted bis-benzimidazole is obtained.

*Example 8*

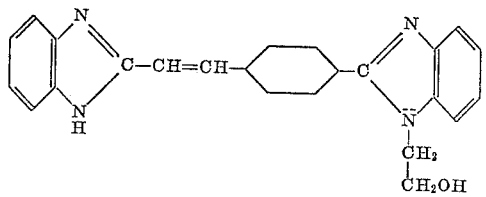

or

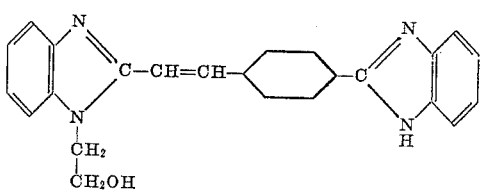

A solution of 3.36 parts of the product of Example 3 in 50 parts of glycolmonomethyl ether containing 0.8 part of caustic and 2 parts of water is treated with 0.88 part of ethylene chlorohydrin by heating at reflux for two hours. After removal of half the solvent and addition of 50 parts of water, the product is recovered by filtration and washed free of alkali; it is the mono N-2-hydroxyethyle derivative of the brightener of Example 3.

If in this example, 1.26 parts of dimethyl sulfate is used in place of the ethylene chlorohydrin the product is the N-methyl derivative of the brightener of Example 3. If, instead, 1.10 parts of 2,3-dihydroxypropyl chloride is used the product is the N-(2,3-dihydroxypropyl) derivative of the brighteners of Example 3.

*Example 9*

100 mg. of brightener was dissolved in 100 ml. dimethylformamide at 80° F. Then 2 ml. of 5 N sodium hydroxide solution and 6 drops surface active agent (Triton X–100) was added; the volume was totaled to 200 ml. with water to give a 0.05% solution. A milky dispersion formed.

50 ml. of the above final stock solution was diluted to 500 ml. with water containing 6 drops of a polyethylene oxide condensate of i-octylphenol, giving a 0.005% brightener solution.

The brightener was applied to cotton, resin-treated cotton and nylon, from the above bath, giving improved whiteness to the fabric.

*Example 10*

A solution of 50 mg. of the product of Example 3 was prepared in 100 ml. of dimethylformamide. 20 ml. aliquot was added to 980 ml. of water containing 2% Deceresol NI (nonylphenol+9 moles ethyleneoxide), and the mixture finally diluted to 2 l. 5 ml. of this dispersion was added to 45 ml. of water and 50 ml. of 1% of a non-ionic detergent in a Launderometer jar. Then a 5 g. piece of cotton modified with 5% polymethoxymethylaminotriazine compound was entered. The jar contents were agitated at 130° F. for 25 minutes. Then the cloth was rinsed with 100 ml. fresh water at 130° F. for 5 minutes and dried. The cloth had a pleasing bright white appearance in contrast to the dull yellowish appearance of the same cotton not laundered with the brightener; and showed a greenish blue fluorescence under UV light. When the laundering was repeated with the brightener for a total of five times the fluorescence increased to 296% of the fluorescent strength found after one laundering, as measured by the fluorimeter.

We claim:

1. A compound of the formula

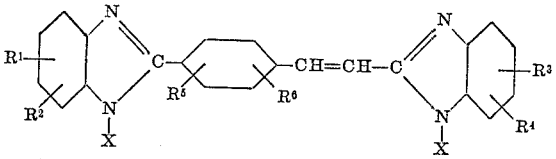

in which $R^1$, $R^2$, $R^3$, $R^4$, $R^5$ and $R^6$ are selected from the group consisting of hydrogen, lower alkyl, lower alkoxy, chlorine and bromine, and each "X" is the same member selected from the group consisting of hydrogen, lower alkyl, allyl, hydroxyethyl, dihydroxypropyl and benzyl.

2. The compound of the formula

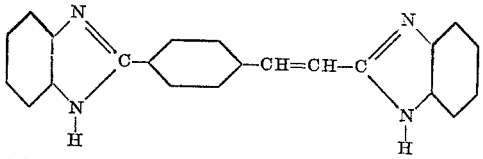

3. The compound of the formula

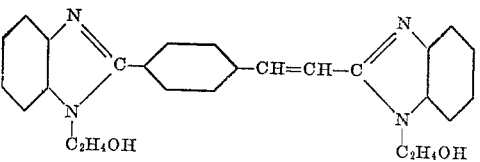

4. The compound of the formula

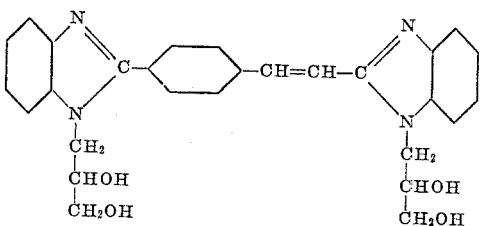

5. The compound of the formula:
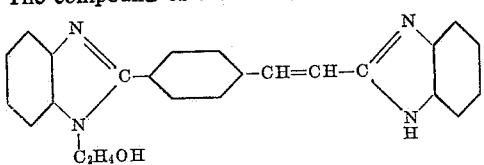
6. The compound of the formula:
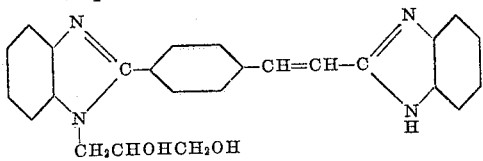
7. The compound of the formula:
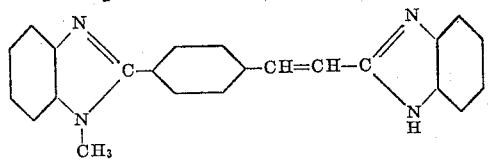
References Cited in the file of this patent
UNITED STATES PATENTS
2,463,264    Graenacher et al. ------- Mar. 1, 1949
FOREIGN PATENTS
535,065    Belgium --------------- July 22, 1955